United States Patent
Widergen et al.

[11] Patent Number: 5,890,064
[45] Date of Patent: Mar. 30, 1999

[54] MOBILE TELECOMMUNICATIONS NETWORK HAVING INTEGRATED WIRELESS OFFICE SYSTEM

[75] Inventors: Ina Widergen, Stockholm; Marie Svensson, Stocksund, both of Sweden; Sven Gunnar Ivar Thrysin, Guildford, United Kingdom

[73] Assignee: Telefonaktiebolaget L M Ericsson (publ), Stockholm, Sweden

[21] Appl. No.: 627,904

[22] Filed: Mar. 13, 1996

[51] Int. Cl.[6] .............................. H04Q 7/20; H04B 1/38; H04M 1/00

[52] U.S. Cl. ........................ 455/445; 455/426; 455/555

[58] Field of Search ................... 455/445, 554, 455/555, 426, 433, 436

[56] References Cited

U.S. PATENT DOCUMENTS

| | | | |
|---|---|---|---|
| 4,599,490 | 7/1986 | Cornell et al. | 455/439 |
| 4,680,786 | 7/1987 | Baker et al. | 455/461 |
| 4,790,000 | 12/1988 | Kinoshita | 455/449 |
| 5,117,450 | 5/1992 | Joglekar et al. | 455/557 |
| 5,235,632 | 8/1993 | Raith | 455/449 |
| 5,260,987 | 11/1993 | Mauger | 455/560 |
| 5,303,287 | 4/1994 | Laborde | 455/426 |
| 5,425,083 | 6/1995 | Furuya et al. | 379/111 |
| 5,440,613 | 8/1995 | Fuentes | 455/436 |
| 5,448,619 | 9/1995 | Evans et al. | 455/426 |
| 5,506,887 | 4/1996 | Emery et al. | 455/445 |
| 5,544,227 | 8/1996 | Blust et al. | 455/426 |
| 5,594,777 | 1/1997 | Makkonen et al. | 455/435 |

FOREIGN PATENT DOCUMENTS

| | | |
|---|---|---|
| 0 462 727 A2 | 12/1991 | European Pat. Off. . |
| WO 94/05126 | 3/1994 | WIPO . |
| WO 94/26073 | 11/1994 | WIPO . |
| WO 95/09514 | 4/1995 | WIPO . |

*Primary Examiner*—Dwayne D. Bost
*Assistant Examiner*—Tracy M. Legree
*Attorney, Agent, or Firm*—Jenkens & Gilchrist P.C.

[57] ABSTRACT

A mobile telecommunications network having an integrated wireless office system is disclosed. A wireless office system is integrated into both a private telephony network (PTN) and a public land mobile network (PLMN) which includes a public cellular system. The wireless office system provides mobile service to corporate mobile terminals (CMTs) that are part of a corporate group of terminals of the PTN. The CMTs of the wireless office system appear to the PTN as normal fixed extension terminals and PTN internal features such as call back, caller identification and operator assistance may be used at the CMTs.

25 Claims, 6 Drawing Sheets

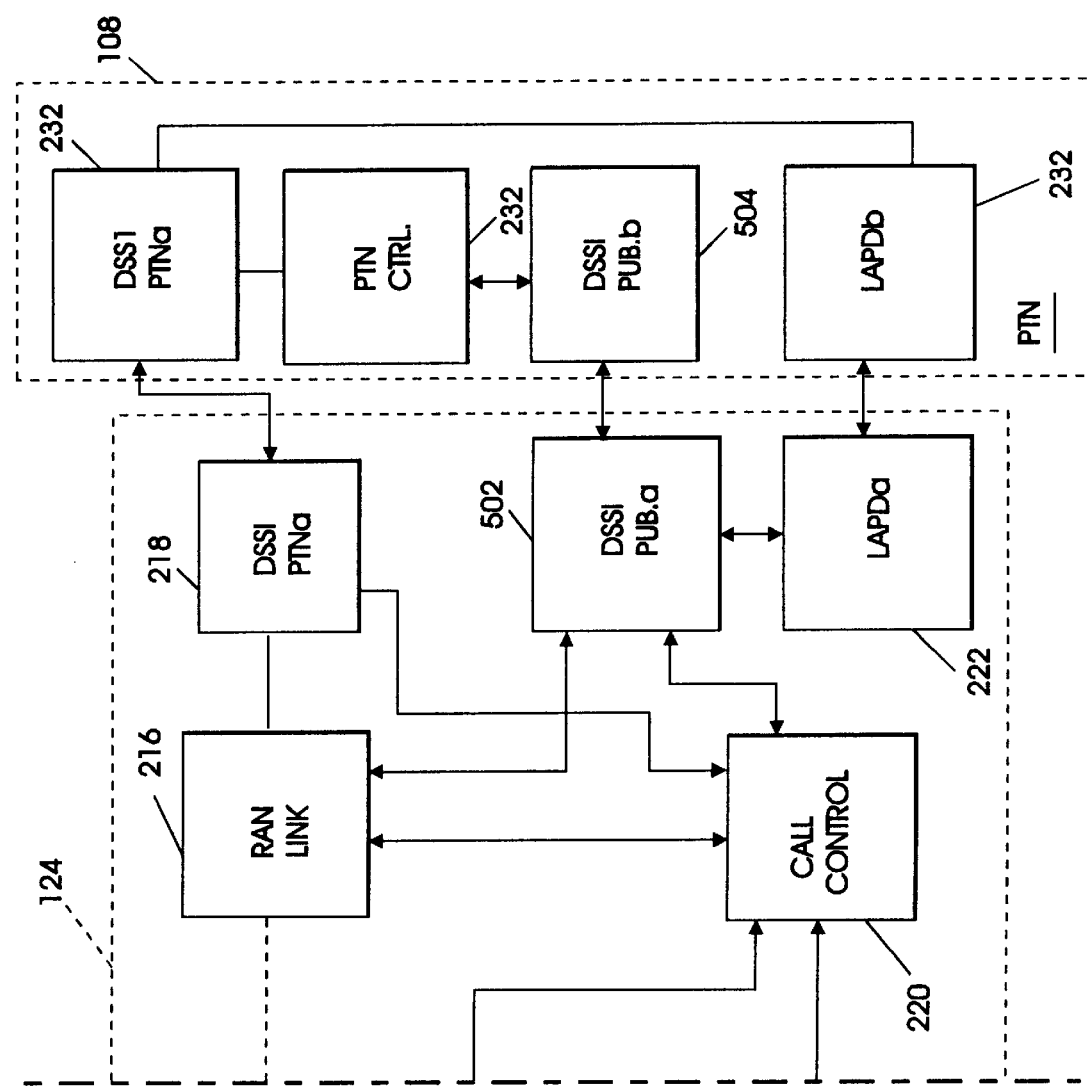

MOBILE TELECOMMUNICATIONS NETWORK HAVING INTEGRATED WIRELESS OFFICE SYSTEM

BACKGROUND OF THE INVENTION

1. Field of the Invention

This invention relates to mobile telecommunications systems and, more particularly, to a system for integrating a private mobile telecommunications system into a public mobile telecommunications network.

2. History of the Prior Art

Recent advances in mobile telecommunications have resulted in a variety of services that may be provided to a mobile subscriber. These services include both private services usually provided within a business environment for private mobile subscribers and public services provided through a public land mobile network for public mobile subscribers. Both private and public mobile service may be provided on a cellular basis, with mobile subscribers being allowed to roam between the coverage areas of different base stations of each of the private and public systems.

Private mobile service is typically provided through a private mobile telephony network that is implemented using a private cordless system standard such as the Cordless Telephone Standard 2 (CT-2) or, the digital European Cordless Telephone Standard (DECT). Private telephony networks are either provided as stand alone systems or, connected to a fixed telephony network. The private mobile telephony network is commonly used to provide mobile service within a single building or office complex of a business.

Public mobile service is typically provided through a cellular telecommunication network implemented using one of the common cellular systems standards such as the Advanced Mobile Phone Service (AMPS) System Standard, the IS-54 Time Division Multiple Access (TDMA) Standard, or the European Groupe Speciale Mobile (GSM) Standard.

The demand for public cellular telecommunication networks to also support indoor or office locations, such as those supported by a private telephony network, has grown the last few years. This demand however, has been largely unsatisfied even though several types of solutions have been implemented in the industry.

A solution using public cellular networks together with private telephony networks that are provided as stand alone or, are connected to a fixed private telephony network, does not allow roaming between the private network and public network. A solution of this type using private cordless systems within indoor and office locations is therefore not able to provide mobile service with roaming in a public cellular network. A second type of solution has been developed that provides service through a public cellular system having indoor coverage and a customized intelligent network service for corporate groups subscribing to the public cellular system. This allows mobile subscribers to use the same mobile station when operating in either the corporate environment or the public network. This service, however, is still a public service provided by the cellular system and, the indoor network is under the control of the cellular system operator. Also, in this type of solution, there may be poor integration of the corporate services into the public cellular system. For example, the presentation of a corporate extension number at a mobile station as a dialed number (A-number) may not be possible. Desktop and mobile stations will also belong to different networks and may provide different services, causing confusion for users. Additionally, corporate management systems for monitoring and tracking will not have the ability to trace and monitor calls that involve members of the corporate group using a mobile station.

A third type of solution uses dual mode mobile stations, e.g., a mobile station capable of operating in both a GSM or DECT system. This type of solution overcomes some of the drawbacks with the previously mentioned solutions. However, a dual mode mobile station user will be provided a different set of services when using the DECT system than then operating on the public cellular system. Also, private to public system seamless handover is not possible and dual mobile stations are complex and, therefore more expensive.

SUMMARY OF THE INVENTION

The present invention provides a wireless office system that is integrated into both a private telephony network (PTN) and a public land mobile network(PLMN) that includes a public cellular system. The wireless office system provides mobile service to corporate mobile terminals (CMTs) that may be part of a corporate group of terminals of the PTN. The corporate group may also include fixed terminals (FTs) of the PTN. The CMTs of the wireless office system appear to the PTN as normal fixed extension terminals. PTN internal features such as call back, caller identification (A-number presentation) and operator assistance may be used at the CMTs. CMTs may also roam throughout the service area of the PLMN that is outside the coverage area of the wireless office system but covered by the public cellular system using one mobile station.

In an embodiment of the invention, a wireless office gateway(WO Gateway) provides the interfaces between the wireless office system and the PLMN and PTN. This embodiment allows CMTs of the wireless office system to roam in the public cellular network. The WO Gateway communicates with the PTN, and appears to the PTN, as a PTN node, i.e., private branch exchange(PBX), or as an integrated services digital network primary rate interface (ISDN PRI)terminal. A corporate group that includes CMTs is assigned a private numbering plan (PNP) within the PTN numbering plan. Within the PNP a personal number (PN) is allocated to each of the CMTs. The corporate group PNP may also include a personal number for fixed terminals. The WO Gateway is allocated a PNP number series that includes the personal numbers of each of the CMTs of the corporate group. WO Gateway also communicates with the public cellular system of the PLMN. Support for communications between the public cellular system and WO Gateway is provided by a service control point(SCP)included in the home location register (HLR) of the PLMN. The SCP includes a function that converts the PN of a CMT to a mobile identification number (MIN) of the CMT for use within the HLR. All calls involving a CMT are routed via the PTN using the PNP.

Calls from a public user of the PSTN or public cellular system made to a CMT of the PTN corporate group are routed via an external line of the PTN and then internally in the PTN to the WO Gateway. Calls from fixed deskphones of the PTN to a CMT are routed internally in the PTN to the WO Gateway, and then to the CMT. When a call to a CMT is originated from a CMT operating in the wireless office system, WO Gateway routes the call to the PTN and, transfers the dialed number for routing internally through the PTN. When a call is made to a CMT roaming in the PLMN outside the coverage area of the wireless office system from the public cellular system, a service control function (SCF) within the SCP converts the PN to a destination terminating in the PTN. The PLMN then routes the call to the PTN through the PSTN. The call is then routed to the WO Gateway internally through the PTN. WO Gateway then inquires the HLR of the PLMN as to the location of the called CMT. A call may be made to public users of the PSTN or public cellular system from a CMT by dialing a prefix.

In another embodiment of the invention, a trunk line is implemented between the mobile services center (MSC) of the PLMN and the WO Gateway. This embodiment supports handover of ongoing calls between cells of the wireless office system and the public cellular system of the PLMN. The embodiment also allows a CMT to use services of the PTN in the public cellular system. In this embodiment, calls between a CMT in the public cellular system and a CMT in the wireless office system are routed directly over the WO Gateway rather than through the PSTN. Also, CMTs roaming in the PLMN may request an external line connection over the trunk line to the PTN to call a public subscriber through the PTN.

In still another embodiment of the invention, the WO Gateway also supports computer supported telephony(CST) functions, such as screening based on the calling number (A-number), location dependant call forwarding, and personal call diversion schemes, within the PTN. In this embodiment, WO Gateway supports both FTs and CMTs of the PTN. CST service is provided to PTN fixed extensions by allowing the fixed extensions to be registered as CMTs in the PLMN SCP database. Fixed extensions of the PTN are defined in the SCP as being constantly active in the location area controlled by a visitor location register (VLR) of the WO Gateway. The CST function allows a FT and a CMT to be connected in an extension pair that is seen as one termination point from both the PTN and PLMN.

DETAILED DESCRIPTION

Figure 1:
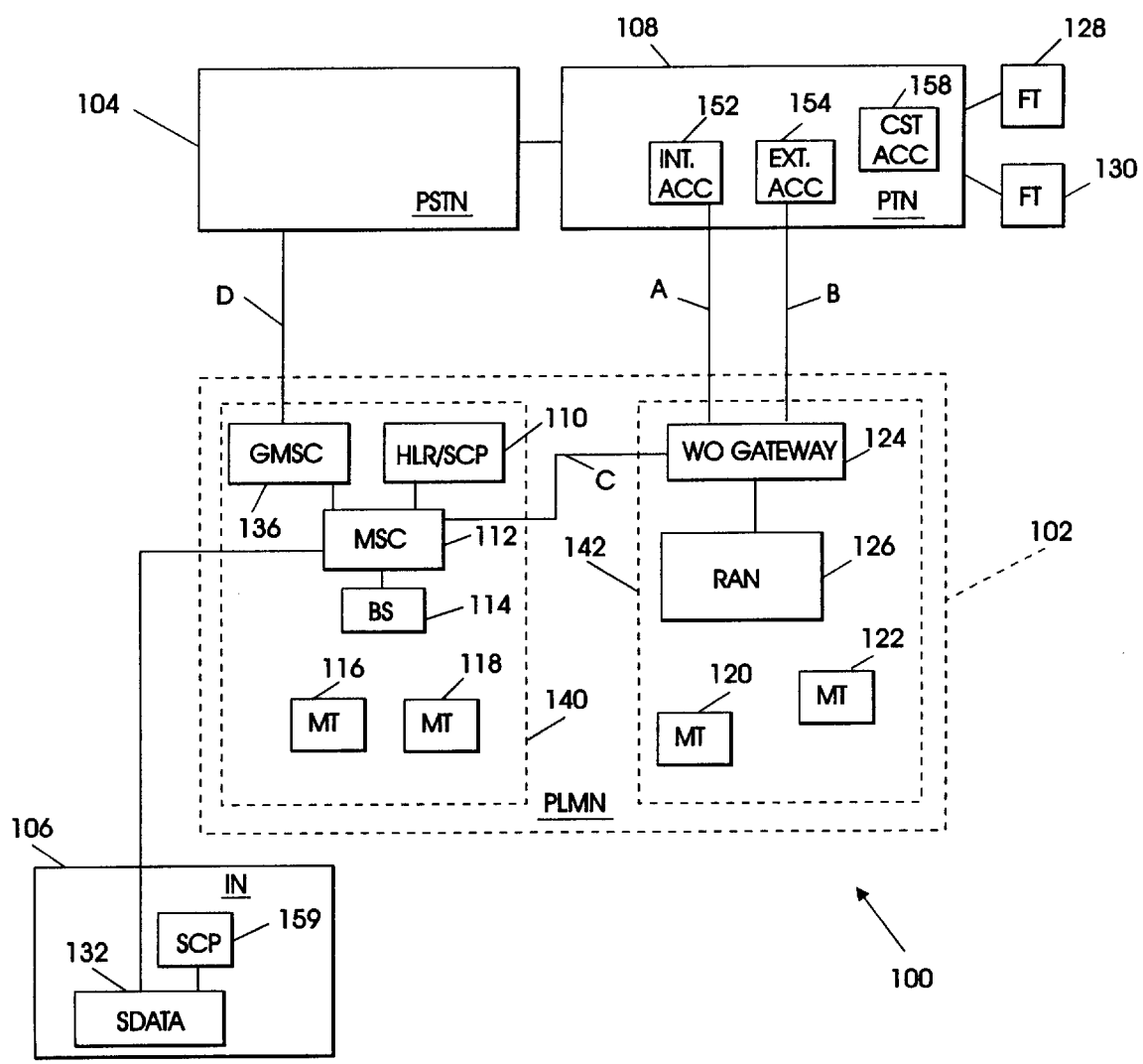
FIG. 1 is a schematic block diagram of a public telecommunications network into which the present invention is implemented.

Referring now to FIG. 1, therein is shown a public telecommunications network 100 into which an embodiment of the invention is implemented. Telecommunications network 100 includes public switched telephone network (PSTN) 104, intelligent network (IN) 106, private fixed telephony network (PTN) 108 and PLMN 102. PLMN 102 includes a public cellular system 140 and a wireless office system 142. Public cellular system 140 may be implemented as one of a number of different cellular system types such as, for example, an IS-54, AMPS or GSM system. Wireless office system 142 is implemented as a private wireless system that operates according to the same standard as public cellular system 140. Public cellular system 140 includes gateway mobile services center (GMSC) 136, home location register/service control point (HLR/SCP) 110, mobile switching center (MSC) 112, base station (BS) 114 and, mobile terminals (MT) 116, 118. Public cellular system 140 may include more than one MSC, BS, GMSC or HLR/SCP, depending on the size of the system. Also, while HLR/SCP 110 is shown as a separate block, the HLR/SCP functions may be implemented into MSC 112 or into other MSCs of public cellular system 140. For the sake of clarity in describing embodiments of the invention when call routing is described, it will be assumed that a mobile terminal is located in the coverage areas of BS 114. The embodiments described will function identically if a mobile terminal happens to be located in coverage areas of another MSC, BS, GMSC or HLR/SCP. Wireless office system 142 includes wireless office (WO) gateway 124, radio access network (RAN) 126 and mobile terminals (MT) 120 and 122. PTN 108 includes fixed extension telephones (FTs) 128 and 130, internal access interface (IntAcc) 152, external access interface (ExtAcc) 154, and, optional computer supported telephony access interface(CSTACC)158. IN 106 includes subscriber database 132 and service control point (SCP) 158.

WO Gateway 124 includes functions that integrate wireless office system 142, PTN 108 and public cellular system 140 together, so that a mobile subscriber may obtain private telephony service from PTN 108 within wireless office system 142 yet, may also operate within public cellular system 140 using one mobile terminal and one subscriber number. WO Gateway 124 may be a software package implemented in self-contained hardware or alternatively, integrated within RAN 126. WO Gateway 124 interfaces with PTN 108 as if integrated within PTN 108. WO Gateway 124 translates between the signaling system of PLMN 102 which may be, for example, ANSI, SS7 or CCITT No. 7, and the internal signaling system of PTN 108. Depending on the type of PTN standards used, WO Gateway 124 either emulates a node of PTN 108 (i.e., a public branch exchange (PBX)) or, an integrated services digital network (ISDN) primary rate interface (PRI) terminal within PTN 108.

A mobile terminal of wireless office system 142 may be assigned to a corporate group of PTN 108. The corporate group may contain both mobile terminals (CMTs) of wireless office system 142 and FTs of PTN 108. A private numbering plan equivalent to the numbering plan used in PTN 108 for FT corporate groups is assigned to the corporate group. Within the corporate group numbering plan, a personal number (PN) is allocated to each of the CMTs. WO Gateway 124 is then allocated a number series in the routing and numbering system of PTN 108. This number series contains the personal numbers of CMTs belonging to the corporate group. For CMTs, this PN is equivalent to the short number (extension) dialed for local calls within PTN 108. For consistency purposes, hereafter when referring to the extension number of FTs within PTN 108 and the extension number of CMTs of wireless office system 142, the term PN will be used.

Users of the Universal WO System of PTN 108 will appear to PTN 108 as a normal FT user. This allows the use of internal services and features of PTN 108, such as call back, caller identification (A-number presentation) and operator assistance. In addition, WO Gateway 124 has a routing function and includes a visitor location register (VLR) (not shown in FIG. 1). WO Gateway 124 interfaces with IntAcc 152 of PTN 108 through interface A and ExtAcc 154 of PTN 108 through interface B, and with cellular system 140 through interface C.

Over interface C, communication between service control point (SCP) of HLR/SCP 110 and WO Gateway 124 is provided through MSC 112.

The signaling between WO Gateway 124 and MSC 112 over interface C may follow any one of several well known industry standards for MSC to MSC signaling, for example, the TIA IS-41 standard for AMPS/D-AMPS or the European Technical Standards Institute (ETSI) standard for GSM MSC to MSC signaling may be used.

Over interface B, WO Gateway 124 and PTN 108 support an ISDN PRI interface emulating a local ISDN switch network termination (NT) function. An external access interface (Extacc) 154 of PTN 108 handles the access of external networks to PTN 108. Through interface B, CMTs in wireless office system 142 may call into PTN 108 as from any public telephony network. Various ISDN primary rate interface communication standards may be used for communications over interface B. For example, in Europe the European Computer Manufacturing Association (ECMA) has detailed a European ISDN standard and, in North America the American National Standards Institute (ANSI) and Bellcore have also developed ISDN standards. These standards are based on the ISDN ITU I-series and Q-series recommendations.

WO Gateway 124 communicates with PTN 108 over interface A as a PTN node or as a ISDN PRI terminal, i.e., as an internal element of PTN 108. PTN Intra Access block (IntAcc) 152 of PTN 108 handles the internal access into PTN 108. WO Gateway 124 may emulate either an internal ISDN PRI terminal (TE1 function) or a node (i.e., a PBX) of PTN 108 using interface A. Various ISDN PRI and PTN node-to-node communication standards may be used over interface A. For example, Q-signaling as specified for use in North America by ANSI and Bellcore may be used.

Figure 4:
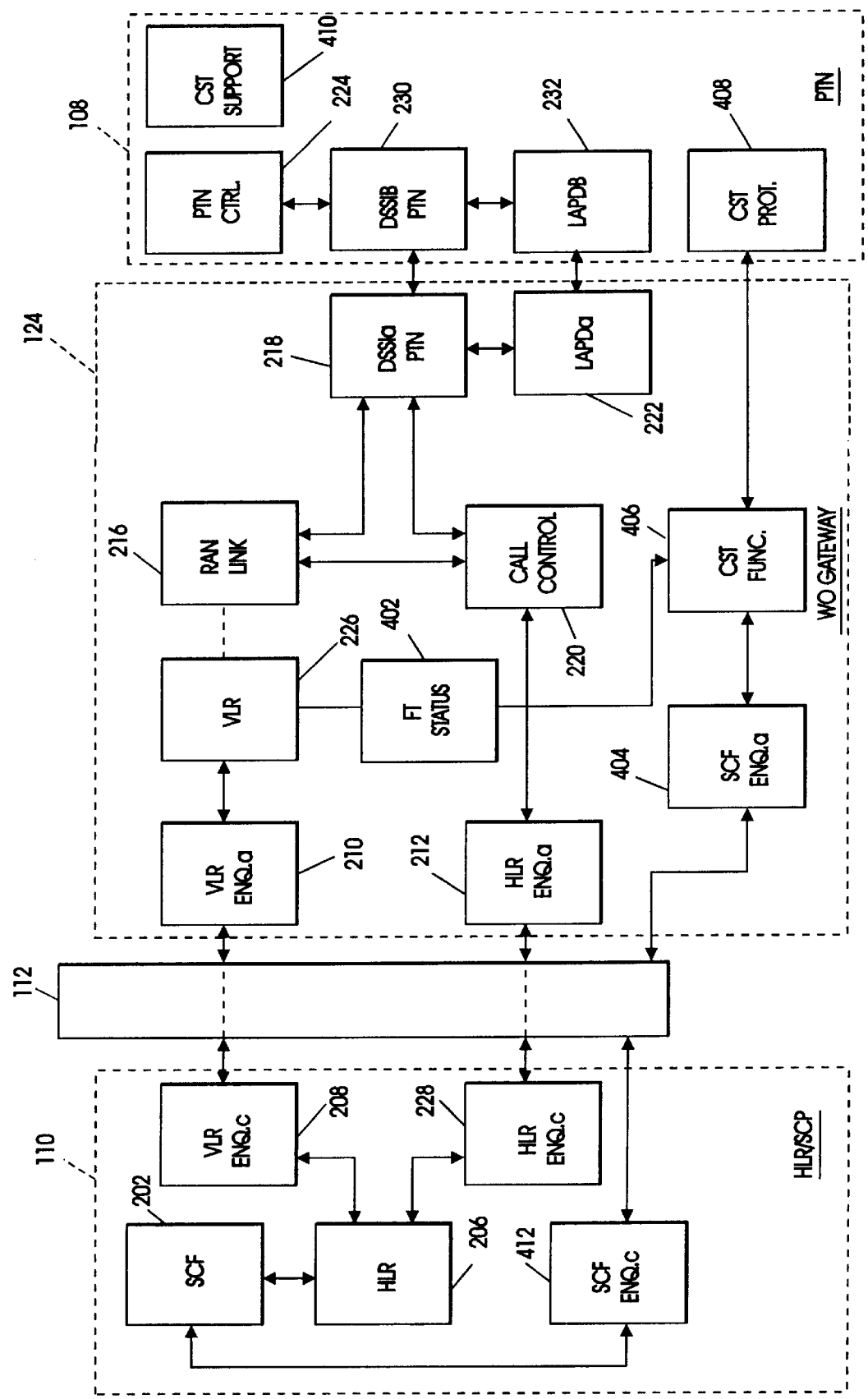
FIG. 4 is a functional block level diagram of an alternative embodiment of the invention shown in FIG. 2 that provides a computer supported telephony function; and, FIG. 5 comprising FIG. 5A

Besides the communication shown in FIG. 4, MSC 112 also controls RAN 126 and radio equipment of RAN 126 through WO Gateway 124.

WO Gateway 124 also communicates with SCP 158 of independent intelligent network (IN) 106. Communications between WO Gateway 124 and IN 106 are performed over the signaling link of interface C via MSC 112, and may follow a standard such as TIA IS-41 (SCP) integrated in PLMN (AMPS/D-AMPS) or the CCITT No. 7 protocol intelligent network application part (INAP).

In the embodiment shown in FIG. 1, all calls involving a CMT operating in the wireless office system are routed via PTN 108. This routing feature allows a CMT operating in the wireless office system to obtain services identical to those offered at FTs of PTN 108.

Calls from public users of PSTN 104 or public MTs of cellular system 140 to CMTs are routed via an external line to PTN 108 and then internally through WO Gateway 124 to the corporate mobile. Calls from FTs of PTN 108 to CMTs will be routed internally within PTN 108 to WO Gateway 124 and then to the CMT.

When a CMT within wireless office system 142 originates a call to an FT of PTN 108 or to another CMT within wireless office system 142, WO Gateway 124 will unconditionally route the call to the PTN 108 and also transparently transfer the dialed number, thus guaranteeing routing via PTN 108. This is possible because the numbering plan of PTN 108 and the corporate group numbering plan are identical.

When a CMT located within cellular system 140 calls the PN of another CMT of wireless office system 142 or the PN of an FT of PTN 108, a service control function of HLR/SCP 110 of cellular system 140 will convert the PN to a MIN number. As an alternative, SCP 159 of IN 106 may perform the conversion. The MIN number will then be translated into a roaming number in HLR which is a destination terminating in PTN 108. FTs of PTN 108 may be assigned a fake MIN number for this purpose. Because PTN 108 is an external network, cellular system 140 will route the call to GMSC 136. The call will then be routed back to WO Gateway 124 via PSTN 104 and PTN 108 and, then to wireless office system 142. WO Gateway 124 then will send a request to HLR 110 for information on the location of the called CMT over interface C.

When a call is made from a CMT located within wireless office system 142 to a public user of the PSTN 104 or a MT in public cellular system 140, an external line from PTN 108 may be requested by dialing a prefix. Depending on the support provided in PTN 108, a second dialtone may be used to provide a procedure identical to an external call from a deskphone.

Figure 2:
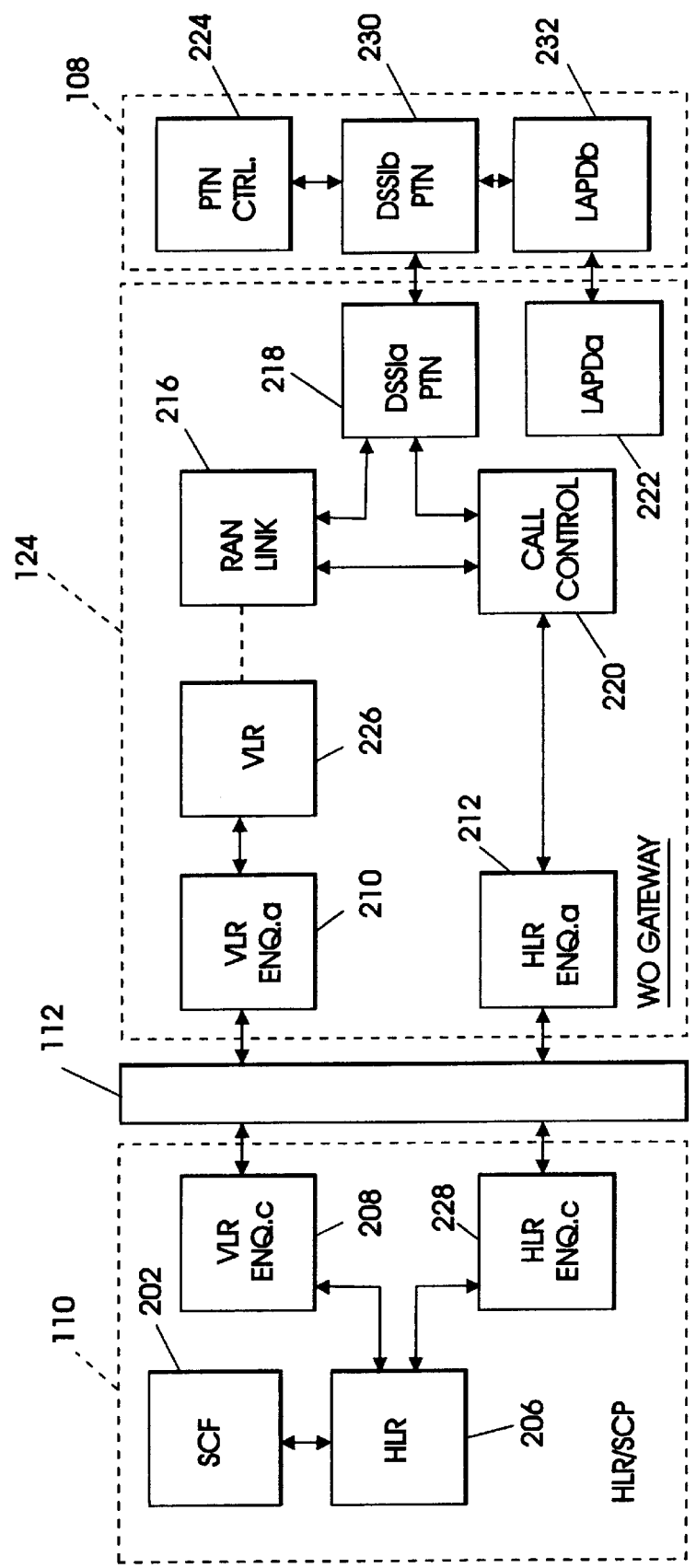
FIG. 2 is a functional block level diagram of an embodiment of the invention that provides a basic call routing service.

Referring now to FIG. 2, therein is shown a functional block diagram of the embodiment of the invention shown in FIG. 1. In this embodiment the SCP used for PN to MIN conversion is located within HLR/SCP 110. The embodiment provides a basic routing function within PLMN 102 for calls involving a CMT of PTN 108. The basic routing function allows CMTs of wireless office system 142 to roam in public cellular system 140. In the embodiment of FIG. 2, interface C is used by WO Gateway 124 to make information requests to HLR/SCP 110 and, for carrying control signals from MSC 112 to RAN 126. Actual call voice traffic between a CMT located in wireless office system 142 and a CMT roaming within cellular system 140, are routed through PSTN 108 and GMSC 136. WO Gateway 124 includes RAN link 216, Digital Subscriber Signaler a (DSS1a) 218, ISDN data link layer protocols a (LAPDa) 222, Call Controller (call control) 220, visitor location register (VLR) 226, HLR Enquirer a (HLR enqa) 212 and VLR Enquirer a (VLR enqa) 210. HLR/SCP 110 includes Service Controller Function (SCF) 202, home location register (HLR) 206, HLR Enquirer c (HLR enqc) 228 and VLR Enquirer c (VLR enqc) 208. PTN 108 contains PTN Controller (PTN Ctrl) 224, Digital Subscriber Signaler b (DSS1b) 230 and ISDN data link layer protocol b (LAPDb) 232.

As described above, all calls involving CMTs are routed through PTN 108. RAN link 216 processes calls involving CMTs that originate in RAN 126 of FIG. 1 by unconditionally routing the call and transparently transferring the dialed number to PTN 108 through DSS1a 218 and DSS1b 230. For calls to a CMT terminating in RAN 126, RAN link 216 performs call setup to the mobile subscriber indicated by a roaming number received from call control 220. DSS1a 218 and LAPDa 222 may emulate either an ISDN PRI terminal or a node of PTN 108. Call control 220 processes call requests received via PTN 108 through DSS1a 218 and DSS1b 230 that terminate with a CMT. VLR 226 includes the visitor's database for mobile subscribers of public cellular system 140 roaming within wireless office system 142. HLR enqa 212 handles communications with HLR/SCF 110 through HLR enqc 220 for determination of the roaming number of a terminating CMT using a lower layer transfer protocol. VLR enqa 210 handles communication with HLR/SCF 110 through VLR enqc 208 for controlling mobility management of CMTs located within wireless office system 142. RAN 126 includes functional entities that perform all functions required for control and routing within the wireless office system 142.

Call setup messages from MSC 112 to WO Gateway 124 over interface C for calls to a CMT requiring a traffic path via PTN 108, and call setup messages from PTN 108 to WO Gateway 124 over interface A requiring a call setup to a CMT in PLMN 102, both are directed to a PN. To distinguish between the two types of calls, a call control function within WO Gateway 124 adds a called network element (CNE) indicating that the call is directed toward PTN 108 or toward PLMN 102. The called network element is added to the call setup record. For example, if the call is requested over interface C, the CNE indicates PTN 108 as the called network and, if requested over interface A, the CNE indicates PLMN 102 as the called network.

The PN is the only number used within WO Gateway 124 and PTN 108 to identify a CMT. Within public cellular system 140, when WO Gateway 124 requests information through VLR enqa 210 on the location of a CMT from HLR/SCP 110 using a PN, SCF 202 converts the PN to the MIN of the CMT. A wireless office system internal numbering plan (WONP) is used for the conversion.

The routing feature of the embodiment of FIG. 2 in which all calls involving a CMT are routed via PTN 108, can be described with reference to the following call scenario cases (Case 1–Case 6):

Case 1: Call from FT in PTN 108 or PSTN 104 to a CMT located in wireless office system 142:

1) The user of a FT in PTN 108 or PSTN 104 originates a call to a CMT by dialing the terminal's PN if calling from PTN 108 or, the terminal's complete company subscriber number if calling from PSTN 104.

2) The PN or subscriber number terminates at a line in PTN 108 directed to WO Gateway 124. PTN Ctrl 224 directs the call to WO Gateway 124 over interface A.

3) As the call is requested over interface A, WO Gateway 124 and call control function 220 sets the called network element (CNE) to PLMN 102.

4) Call control function 220 inquires HLR 206 through HLR enqa 212 and HLR enqc 228 using the called CMT's PN as the B-number and wireless office system 142 as originating entity. Since the call is indicated as originating in the wireless office system 142, HLR determines that the called B-number shall be retrieved by SCF 202. SCF then retrieves the terminating MIN from the WONP database using the PN as the key. A roaming number for the called CMT subscriber is then retrieved from HLR 206 and returned to WO Gateway 124 through HLR enqc 228 and HLR enqa 212.

5) Because the called CMT is located within wireless office system 142, the roaming number terminates in RAN 126.

6) Call control 220 completes the call to the CMT through RAN link 216.

Case 2: Call from a first CMT located in wireless office system 142 to a second CMT located in wireless office system 142 or to an FT of PTN 108:

1) The user of the first CMT originates a call by dialing the PN of a FT of PTN 108 or the PN of a second CMT located within wireless system 142.

2) RAN link 216 of WO Gateway 124 receives the call through RAN 126.

3) Because the call is from a CMT, the call is unconditionally routed to PTN 108. Also, the dialed number is transparently sent to PTN 108 on the signaling link.

4) If the dialed number terminates at a FT, PTN 108 completes the call.

5) If the dialed number is the PN of a second CMT, PTN 108 routes the call (with the PN number of the second CMT as the B-number) back to WO Gateway 124.

6) As the call is routed back to WO Gateway 124 over interface A, WO Gateway 124 Call Control 220 sets the called network identity to PLMN 102.

7) Call control 220 inquires HLR 206 through HLR enqa 212 and HLR enqb 208 using the second CMT's PN number as the B-number. Since the call is originated by a CMT, HLR determines that the called B-number shall be retrieved by SCF. SCF then retrieves the terminating point from the PNP database using the PN as the key. A roaming number for the second CMT is then retrieved from HLR 206 and returned to WO Gateway 124 through HLR enqc 228 and HLR enqa 212.

7) Because the second CMT is located within wireless office system 142, the roaming number terminates in RAN 126.

8) Call control 220 completes the call to the second CMT through RAN link 216.

Case 3: Call from either a CMT roaming in public cellular system 140, or a public mobile terminal (PMT) located in cellular system 140 to either of a CMT located in wireless office system 142 or an FT of PTN 108:

1) The user of a CMT roaming within cellular system 140 originates a call by dialing a PN of CMT or, alternatively, the user of a PMT originates a call by dialing a complete subscriber number for a CMT.

2) MSC 112 receives the call through base station 114 and inquires HLR 206 through HLR enqc 228 using the called number as the B-number and the calling mobile terminal MIN as the originating number. Since the call is originated by a CMT, HLR 206 determines that the called B-number shall be retrieved by SCF 202. SCF 202 then retrieves the terminating point from the PNP database using the PN as the key. In the case of the PMT originating the call, the termination point is directly retrieved from HLR 206 without use of the PNP database. In either case, the termination point is a fixed telephone number indicated as one of the PTN numbers in PSTN 104. The number may belong to the WO Gateway 124 number series or be the number of a FT of PTN 108. The PSTN number is returned to MSC 112.

3) The call is routed to GMSC 136.

4) GMSC 136 performs call setup toward PSTN 104 using the full subscriber number of the termination point.

5) PSTN 104 performs call setup towards PTN 108 using direct inward dialing to reach the called number in PTN 108.

6) If the called number terminates at FT of PTN 108, the call is completed. If the called number belongs to the number series of WO Gateway 124, PTN Ctrl 124 routes the call to WO Gateway 124 over interface A using the PN of the called CMT as the B-number.

7) As the call is received in WO Gateway 124 over interface A, call control 220 sets the called network identity to PLMN 102.

8) Call control function 220 inquires HLR 206 through HLR enqa 212 and HLR enqc 228 using the PN number of the called CMT as B-number and the wireless office system 142 as the originating entity. Since the call is indicated as originating in the wireless office system 142, HLR determines that the called B-number shall be retrieved by SCF 202. SCF then retrieves the terminating MIN from the WONP database using the PN as the key. A roaming number for the called CMT is then retrieved by HLR 206 and returned to WO Gateway 124.

9) The roaming number terminates in RAN 126.

10) The call to the CMT is completed.

Case 4: Call from a CMT located within wireless office system 142 or from a FT of PTN 108, or from a fixed phone in PSTN 104 to a CMT roaming within public cellular system 140:

1) The user of a fixed deskphone of PTN 108 or a CMT located within wireless office system 142 originates the call by dialing the PN of a CMT that is roaming in public cellular system 140. Alternatively, the user of a public phone within PSTN 104 dials the complete company subscriber number of the CMT.

2) The PN or company subscriber number terminates at a line in PTN 108 that belongs to the number series of WO Gateway 124. PTN Ctrl 224 then routes the call to WO Gateway 124 using the PN of the called CMT as the B-number over interface A.

3) As the call is received in WO Gateway 124 over interface A, call control 220 sets the called network identity to PLMN 102.

4) Call control 220 inquires HLR 206 using the PN of the called CMT as the B-number and wireless office system 142 as the originating entity. Since the call is indicated as originating in the wireless office system 142, HLR determines that the called Bnumber shall be retrieved by SCF 202. SCF then retrieves the terminating MIN from the WONP database using the PN as the key. A roaming number is retrieved by HLR 206 and returned to WO Gateway 124.

5) The roaming number terminates in a node of public cellular system 140, and WO Gateway 124 routes the call to PTN 108 for outgoing connection through PSTN 104 and PLMN 102.

6) PTN 108 functions for a usual call directed outward to the PSTN 104 and routes the call to PSTN 104 with the roaming number as B-number.

7) PSTN 104 identifies that the roaming number is within public cellular system 140 and routes the call to GMSC 136.

8) GMSC 136 routes the call to MSC 112.

9) The call to the CMT is completed within public cellular system 140.

Case 5: Call from CMT located in wireless office system 142 to any public subscriber (PMT within PLMN 102 or any other public subscriber within PSTN 104):

1) The user of a CMT located within wireless office system 142 originates a call by dialing a two digit external line prefix plus a public telephone number to request a call to the public subscriber via an external line of PTN 108.

2) RAN link 216 of WO Gateway 124 receives the call through RAN 126.

3) Because the caller is a CMT, the call is unconditionally routed to PTN 108. The dialed number is also transparently sent to PTN 108 on the signaling link.

4) PTN 108 functions as for any call outgoing to the public network, it routes the call to PSTN 104 with the dialed number as B-number.

5) PSTN 104 identifies the destination of the dialed number. If the destination is in PSTN 104, the call is completed. If the dialed number is found in PLMN 102, the call is routed to GMSC 136 and Steps 6, 7 and 8 are completed.

6) GMSC 136 inquires HLR 206 using the dialed number as the B-number and the public PSTN number as the originating entity. HLR 206 recognizes this number as being a PSTN subscriber not belonging to the WONP in PLMN 102 and the termination point is directly retrieved without interaction with SCF 202. HLR 206 returns a roaming number for the PMT to GMSC 136.

7) GMSC 136 routes the call to MSC 112 as indicated by the roaming number.

8) The call to the PMT is completed.

Case 6: Call from a CMT located within cellular system 140 or from a PMT located within cellular system 140 to a CMT located within cellular system 140:

1) A CMT user roaming within cellular system 140 originates a call by dialing the PN of another CMT who is located within cellular system 140. Alternatively, a PMT dials the complete company subscriber number of a CMT located within cellular system 140.

2) MSC 112 inquires HLR 206 using the dialed number as the B-number and the MIN of the calling mobile terminal as the originating number. Since the call is originated by the CMT, HLR determines that the called B-number shall be retrieved by SCF. SCF then retrieves the terminating point from the PNP database using the PN as the key. For a call from a PMT, the termination point is directly retrieved. In either case, the point is a fixed PSTN number that belongs to the number series of WO Gateway 124. The PSTN number is then returned to MSC 112.

3) The call is routed to GMSC 136.

4) GMSC 136 performs call setup to PSTN 104 using the PSTN number.

5) PSTN 104 performs call setup to PTN 108 using direct inward dialing (DID) to reach the number in PTN 108.

6) As the DID number belongs to the number series of WO Gateway 124, PTN Ctrl 224 routes the call to WO Gateway 124 over interface A using the PN of the called CMT as the B-number.

7) As the call is received at WO Gateway 124 over interface A, call control 220 sets the called network identity to PLMN.

8) Call control function 220 inquires HLR 206 through HLR enqa 212 and HLR enqc 228 using the PN of the called CMT as the B-number and the wireless office system 142 as the originating entity. Since the call is indicated as originating in the wireless office system 142, HLR determines that the called B-number shall be retrieved by SCF 202. SCF then retrieves the terminating MIN from the WONP database using the PN as the key. A roaming number is returned to WO Gateway 124.

9) Because the roaming number terminates in a node of public cellular system 140, WO Gateway 124 routes the call to PTN 108 for outgoing connection through PSTN 104 to public cellular system 140.

10) PTN 108 functions as for any call requested outward to PSTN 104, it routes the call to PSTN 104 using the roaming number as the B-number.

11) PSTN 104 identifies that the roaming number is found in public cellular system 140 and routes the call to GMSC 136.

12) GMSC 136 routes the call to MSC 112 as indicated by the roaming number of the called CMT.

13) The call to the CMT is completed.

Figure 3:
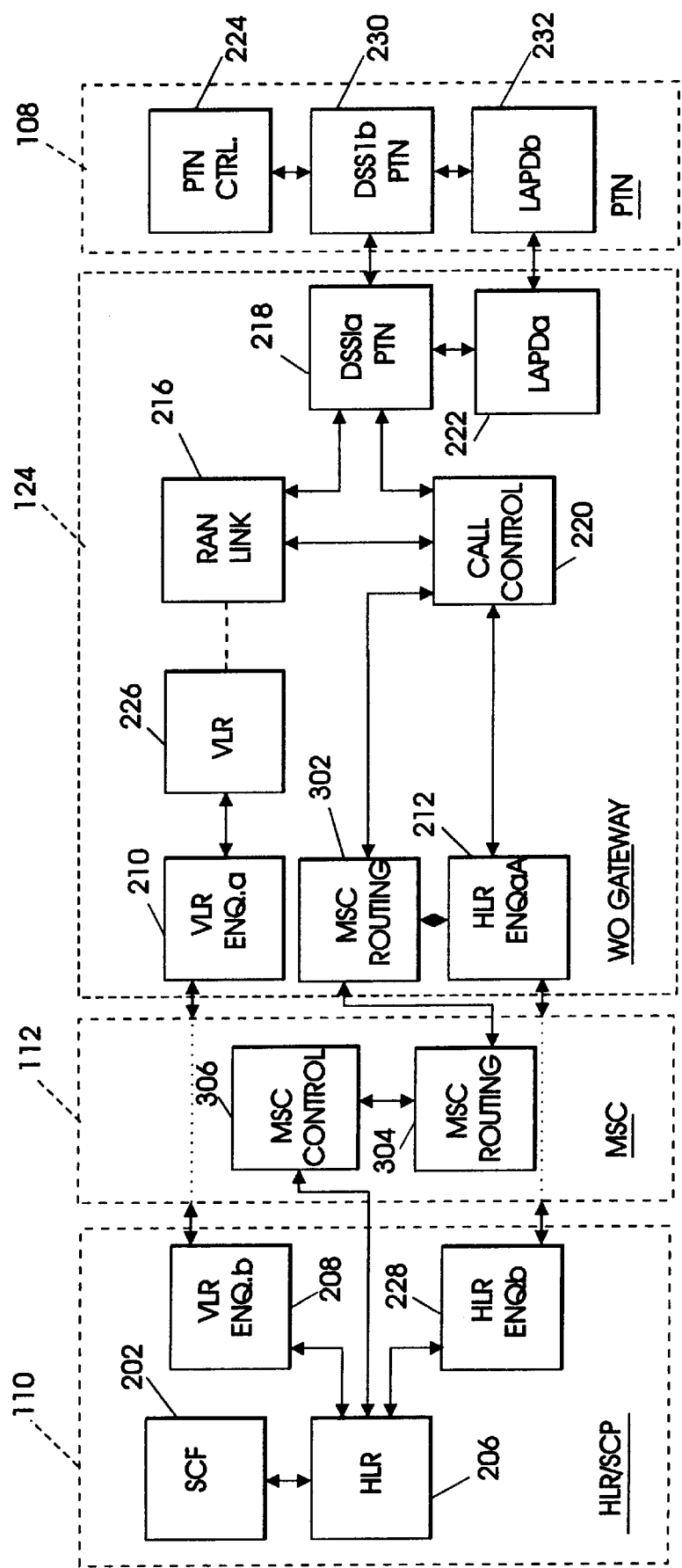
FIG. 3 is a functional block level diagram of an alternative embodiment of the invention shown in FIG. 2 that provides a direct trunk line connection between a public cellular system and a wireless office system.

Referring now to FIG. 3, therein is shown another embodiment of the invention. This embodiment may be implemented into the system shown in FIG. 1. This embodiment supports handover of ongoing calls between cells of the wireless office system 142 and public cellular system 140. The embodiment also allows a CMT to use services of PTN 104 while in public cellular system 142. The embodiment of FIG. 3 differs from the embodiment of FIG. 2 in that in FIG. 3, interface C provides a direct trunk line connection between MSC 112 and WO Gateway 124 in FIG. 3. The direct trunk line is capable of carrying call traffic between MSC 112 and WO Gateway 124. CMTs in public cellular system 140 and wireless office system 142 may be connected directly over the trunk line between MSC 112 and WO Gateway 124. Routing through PSTN 108 and GMSC 136 is not required for these calls. Also, handover between cells of wireless office system 142 and cells of cellular system 140 is supported. Additionally, this configuration allows a CMT roaming in public cellular system 140 to call a public subscriber of PSTN 104 by requesting an external line from PTN 108. The trunk link between MSC 112 and WO Gateway 124 is only used for connection of corporate group MTS to WO Gateway 124. Calls from PMTs to CMTs are routed via GMSC 136-PSTN 104-PTN 108 and WO Gateway 124 as in the embodiment of FIG. 2.

In the configuration of FIG. 3, additional functions have been added beyond the configuration shown in FIG. 2. WO Gateway 124 contains the additional MSC routing function provided by MSC routing a302. Also, MSC 112 contains the additional MSC routing function provided by MSC routing b304 and MSC control 306. In this configuration call control 220 is also enhanced to handle outgoing calls by CMTs through MSC 112 towards PTN 108 and, to route calls made to CMTs in MSC 112 over interface C if the roaming number terminates in cellular system 140. MSC control 306 performs the normal functions of the MSC 112 and is used in FIG. 3 to differentiate these functions from MSC routing b304 functions.

The embodiment of FIG. 3 can be described with reference to FIG. 1, and the following call scenario cases (Case 7–Case 10):

Case 7: Call from a CMT roaming within cellular system 140 to a CMT located within wireless office system 142:

1) The user of a CMT roaming within cellular system 140 originates a call by dialing the PN of another CMT located within cellular system 140.

2) MSC 112 receives the call through BS 114 and inquires HLR 206 using the PN of the called CMT as the B-number and the MIN of the calling CMT as the originating number. Since the call is originated by the CMT, HLR determines that the called B-number shall be retrieved by SCF. SCF then retrieves the terminating point from the as database using the PN as the key. The terminating point is a B-subscriber number that appears as a fixed telephony number (PTN group number in PSTN belonging to the PNP) in the public cellular network 142. A gateway number, pointing to WO Gateway 124, is then returned.

3) The call is routed from MSC 112 to WO Gateway 124 with the PN of the called CMT as the B-number. As the call is received over the trunk line of interface C, call control 220 sets the called network identity to PTN.

4) WO Gateway 124 performs an outgoing gateway function to PTN 108 with the PN of the called CMT as Bnumber.

5) The called PN belongs to the WO Gateway PNP 50, PTN ctrl 224 routes the call back (with the PN as the Bnumber) to WO Gateway 124 over interface A.

6) As the call is received at WO Gateway 124 over interface A, call control 220 sets the called network identity to PLMN.

7) Call control 222 function inquires HLR 206 through HLR enqa 212 and HLR enqb 220 using the called PN as the B-number and the corporate wireless system 140 as originating entity. Since the call is indicated as originating in the wireless office system 142, HLR determines that the called B-number shall be retrieved by SCF 202. SCF then retrieves the terminating MIN from the WONP database using the PN as the key. A roaming number is retrieved by HLR 206 and returned to WO Gateway 124.

8) The roaming number terminates in RAN 126.

9) The call to the CMT is completed.

Case 8: Call from CMT located in wireless office system 142 to CMT located in public cellular system 140.

1) The user of a CMT in wireless office system 142 originates the call by dialing the PN of a CMT located in public cellular system 140.

2) RAN link 216 function of WO Gateway 124 receives the call from RAN 126.

3) As the caller is a CMT, the call is unconditionally routed to PTN 108. The dialed PN is also transparently sent to PTN 108 on the signaling link.

4) The PN terminates at a line in PTN 108 belonging to the assigned number series of WO Gateway 124. PTN Ctrl 224 forwards the call (with the PN number of the CMT as the B-number) to WO Gateway 124 over interface A.

5) As the call is received at WO Gateway 124 over interface A, call control 220 sets the called network identity to PLMN.

6) Call control 220 of WO Gateway 124 inquires HLR 206 with the PN number of the CMT as the B-number and wireless office system 142 as the originating entity. Since the call is indicated as originating in the wireless office system 142, HLR determines that the called B-number shall be retrieved by SCF 202. SCF then retrieves the terminating MIN from the WONP database using the PN as the key. A roaming number is retrieved by HLR 206 and returned to WO Gateway 124.

7) The roaming number terminates in a node of public cellular system 140, WO Gateway 124 routes the call to MSC 112 of public cellular system 140 as indicated by the roaming number.

8) The call to the CMT located in public cellular system 140 is completed.

Case 9: Call from a CMT roaming in public cellular system 140 to a PMT in public cellular system 140.

1) The user of a CMT roaming in public cellular system 140 originates a call by dialing the external line prefix plus the number of a PMT to request a call to the PMT located in public cellular system 140.

2) MSC 112 inquires HLR 206 using the MIN of the CMT as the originating number. Since the call is originated by a CMT, HLR determines that the called B-number shall be retrieved by SCF. SCF then retrieves the terminating point from the PNP database using the PN as the key. The B-subscriber (the external line function), is located in PTN 108. In public cellular system 142, the B-subscriber appears as a fixed telephony user. Therefore, a gateway number, pointing to WO Gateway 124, is returned.

3) The call is routed to WO Gateway 124.

4) WO Gateway 124 requests an external line from PTN 108.

5) PTN 108 acts as for any call requested to a public user and routes the call to PSTN 104 with the dialed number as B-number.

6) PSTN 104 identifies the destination as being found in PLMN 102 and the call is routed to GMSC 136.

7) GMSC 136 inquires HLR 112 with the dialed number as the B-number and a public PSTN number (one belonging to the corporate group of PTN 108) as originating entity. HLR 112 recognizes this number as not belonging to the WONP of wireless office system 142 and the termination point is directly retrieved without interaction with SCF 202. HLR 112 returns the roaming number of the public subscriber.

8) GMSC 136 routes the call to MSC 112, as indicated by the roaming number.

9) The call to the CMT is completed.

Case 10: Call from a PMT in public cellular system 140 to a CMT roaming in public cellular system 140:

1) The user of a PMT in public cellular system 140 dials a complete company subscriber number to call a CMT located in public cellular system 140.

2) MSC 112 inquires HLR 206 using the complete company subscriber number as the B-number and the MIN of the calling PMT as the originating number. Since the caller is a PMT, the termination point is retrieved without support from SCF 202. The termination point is a fixed telephony number that is one of the PTN numbers in PSTN belonging to the PNP of WO Gateway 124. A PSTN gateway number to PSTN 104 is returned.

3) The call is routed to GMSC 136.

4) GMSC 136 performs call setup towards PSTN 104 using the full company subscriber number.

5) PSTN 104 performs call setup towards PTN 108 with the full company subscriber number.

6) The PN belongs to the PNP of WO Gateway 124. PTN Ctrl 224 routes the call to WO Gateway 124.

7) As the call is received at WO Gateway 124 over interface A, call control 220 sets the called network identity to PLMN.

8) Call control 220 inquires HLR 206 with the PN of the called CMT number as the B-number and the wireless office system 142 as the originating entity. Since the call is indicated as originating in the wireless office system 142, HLR determines that the called Bnumber shall be retrieved by SCF 202. SCF then retrieves the terminating MIN from the WONP database using the PN as the key. A roaming number is returned to WO Gateway 124.

9) The roaming number terminates in a node of public cellular system 140 and WO Gateway 124 routes the call to MSC 112 as indicated by the roaming number.

10) The call to the CMT is completed.

The embodiment shown in FIG. 3 may also be configured to include the alternative function (Guest function) of allowing a PMT to roam as if wireless office system 142 is contained within PLMN 102. With the guest function, RAN 126 and WO Gateway 124 may support PMTs of public cellular system 140 not belonging to the corporate group (guests) within wireless office system 142. This embodiment allows PMTs to use wireless office system 142 as part of public cellular system 140.

In the guest function, WO Gateway 124 is enhanced to perform a switch function for PLMN 102 without support from PTN 108. RAN link 216 is enhanced to perform calling number (A-number) analysis when a PMT or CMT operating in wireless office system 142 initiates a call. During the A-number analysis, RAN link 216 retrieves information on the calling MT from VLR 214 and determines if the MT is a corporate or public MT. MSC routing function 302 is enhanced to handle guests on the direct trunk from MSC 110 to WO Gateway 124. VLR 226 is enhanced to allow differentiation between PMTs and CMTs when a MT registers in wireless office system 142. VLR 226 determines the user characteristics from the subscriber database of HLR 206. The subscriber characteristics are stored in registers within VLR 226.

When a mobile subscriber registers in a cell of wireless office system 142, the attributes of the subscriber (public or corporate group) are downloaded from HLR 206 and stored in VLR 226 of WO Gateway 124. When processing calls involving mobile subscribers located within the wireless office system 142, WO Gateway 124 will use the attribute information to distinguish between guests and corporate mobile subscribers. In this feature, calls involving roaming public mobile subscribers (guests) are routed over the direct trunk line between MSC 112 and WO Gateway 124.

When a call is initiated from a public mobile terminal located within wireless office system 142, call control 220 requests location information from HLR 206, through HLR enqa 217 and HLR enqb 228 and receives a roaming number in return. Call control 220 routes the call to the PMT according to the roaming number. When a call is initiated to a PMT roaming within wireless office system 142, call control 122 routes the call to the guest roaming number. The embodiment, including the guest function may be described with reference to FIG. 3 and the following call scenario cases (Case 12-Case 13):

Case 12: Call from a PMT within wireless office system 142 to a CMT within wireless office system 142.

1) The user of PMT in wireless office system 142 originates a call by dialing the complete company subscriber number of a CMT, as for any public user.

2) RAN link 216 function of WO Gateway 124 determines that the caller is a guest. Call control 220 of WO Gateway 124 receives the call.

3) WO Gateway 124 inquires HLR 206 using the dialed number as the B-number and the MIN of the PMT as originating number. Because the caller is a PMT (guest), the termination point is directly retrieved. The termination point is a fixed telephony number that is one of the PTN group numbers in PSTN belonging to the PNP of the WO Gateway 124. A PSTN gateway number is returned.

4) The call is routed to MSC 112.

5) The call is routed to GMSC 136.

6) GMSC 136 performs call setup towards PSTN 104 using the full dialed company subscriber number.

7) PSTN 104 performs call setup towards PTN 108 using direct inward dialing to reach the called subscriber number in PTN 108.

8) The called number terminates at a line tied to the PNP of the WO Gateway 124. PTN ctrl 224 routes the call (with the PN of the corporate subscriber as Bnumber) to WO Gateway 124 over interface A.

9) As the call is received at WO Gateway 124 over interface A, WO Gateway call control 220 sets the called network identity to PLMN.

10) Call control 220 function inquires HLR 206 with PN of the called CMT as the B-number and the wireless office system 142 identified as the originating entity. Since the call is indicated as originating in the wireless office system 142, HLR determines that the called B-number shall be retrieved by SCF 202. SCF then retrieves the terminating MIN from the WONP database using the PN as the key. A roaming number is returned to WO Gateway 124.

11) The roaming number terminates in RAN 126.

12) The call to the CMT is completed.

Case 13: Call from a CMT within wireless office system 142 to a PMT roaming in wireless office system 142:

1) The user of a CMT within wireless office system 142 originates a call by dialing the external line prefix plus the number of a PMT to request a call to a PMT via an external line of PTN 108.

2) RAN link 216 of WO Gateway 124 determines that the caller is a CMT.

3) RAN link 216 unconditionally routes the call to PTN 108. The dialed number is transparently sent to PTN 108 on the signaling link.

4) PTN 108 acts as for any call requested to the public world, it routes the call to PSTN 104 with the dialed number as the B-number.

5) PSTN 104 identifies the destination of the dialed number as in public cellular system 140 and the call is routed to GMSC 136.

6) GMSC 136 inquires HLR 206 with the dialed number as the B-number and a public number of PSTN 104 (one belonging to the PTN corporate group CMT) as the originating caller. HLR 206 recognizes the dialed number as a subscriber not belonging to a WO and the termination point is directly retrieved without interaction with SCF 202. HLR 206 returns the roaming number of the PMT to GMSC 136.

7) GMSC 136 routes the call to MSC 112 as indicated by the roaming number.

8) MSC 112 routes the call to WO Gateway 124 with the roaming number as the destination.

9) The roaming number terminates in RAN 126.

10) The call to the PMT is completed.

WO Gateway 124 may also be configured to support an application for computer supported telephony. For this function, signal interchange between WO Gateway 124 and PTN 108 is performed over interface A. The function of PTN 108 that communicates with a system for computer supported telephony (e.g., Call Centre or Automatic Call Distribution (ACD)) is implemented in CST Access 158. The computer supported telephony is provided to PTN 108 over the ISDN link of interface A by communications between WO Gateway 124 and CST Access 158. The computer supported telephony may be according to the ECMA Computer Supported Telephony Application (CSTA) or ANSI Switch Computer Application Interface (SCAI) standards. A number of other industry standards, created by the large PTN vendors like AT&T and Northern Telecom, may also be used.

Referring now to FIG. 4, therein is shown still another configuration of the embodiment of the invention shown in FIG. 1. In the configuration shown in FIG. 4, WO Gateway 124 provides a computer supported telephony (CST) interface between PTN 108 and PLMN 102. The CST function may be used to provide PTN 108 with call completion information.

In the configuration of FIG. 4, six functional blocks have been added to the embodiment of FIG. 2. WO Gateway 124 includes SCF Enqa 404, CST Func. 406, FE status 402. HLR/SCP 110 now includes SCF Enqc 412 and PTN 108 now includes CST prot 408 and CST support 410.

SCF Enqa 404 and SCF Enqc 128 allow requests from CST Func. 406 to SCF 202 for call completion information. The messages between SCF Enqc 412 and SCF Enqa 404 are carried through MSC 112. CST Func 406 provide computer support to PTN 108 by utilizing SCF 202. In the configuration shown in FIG. 4, SCF 202 is included in HLR/SCP 110. As an alternative, CST Func. may use an independent SCF such as one contained in SCP 159 of IN 106. CST Func. 404 may request a trunk channel connection to HLR/SCP 110 to enable inband communication, e.g., voice prompts. In band communication requires that a trunk line is supported between MSC 112 and WO Gateway 124 as in the configuration of FIG. 3.

The CST function provided by WO Gateway 124 may be configured to support both FTs and CMTs of PTN 108. FT using the CST function are registered as CMTs of wireless office system 142 within the database of HLR/SCP 110. Because the FTs do not dynamically register in PLMN 102, they are defined in the database of HLR/SCP 110 as located in the area controlled by VLR 226 of WO Gateway 124. Examples of services that may be provided by SCF 202 include call screening based on the A-number, time and location; black/white list; location dependent call forward and personal call direction schemes.

CST prot. 408 supports the appropriate computer supported telephony protocol between WO Gateway 124 and PTN 108. FT status 406 allows an FT of PTN 108 to appear as a CMT to VLR 226. When HLR/SCP 110 requests information on an FT, VLR 214 will request FT status 406 to provide FT status information (free, busy, out of order, etc.). FT status 406 determines the state of an FT via CST func. 406. CST Func. 406 is capable of receiving DTMF tones from an FT of PTN 108, and performs instructed task towards the subscriber profile within SCF 202. A user may control his/her subscriber profile by using this feature.

A feature of the CST function is the ability to connect an FT and a CMT of PTN 108 in an extension phone pair, the CMT and FT are seen as one termination point from the view point of PTN 108.

The CST function allows a corporate group user to create a personal routing scheme. For example, the user may have a call forward to voice mail if one or both of the terminals/deskphone of an extension phone pair is busy. The user may also have the call forwarded to voice mail after a certain number of active rings on the CMT. As a third example, if the CMT is not active within PLMN 102, the user can have a call forward to a second FT after a certain number of rings on a first FT. Examples of other types of features allowed by the CST function include simultaneous ring on the CMT and FT of an extension pair, or providing prompts in voice mail to allow a caller to select a forwarding destination.

For the CST function, a personal profile for each subscriber using the function is stored within SCF 202 of HLR/SCP 110. The profile may be modified by dual tone multiple frequency (DTMF) signaling from a DTMF phone. To change his/her profile, a subscriber sets up a call to a profile control function included in CST FUNC 406 of WO Gateway 124 and the DTMF signaling is performed in band on the path connections. Alternatively, the profile may be controlled by a computer application communicating directly with HLR/SCP 110.

The embodiment of FIG. 4 may be described with reference to FIG. 1, and the following call scenario case (Case 14):

Case 14: Providing IN Service

1) A CMT using the mobile IN service is defined as a "computer supported user" in PTN 108. A call made to the user's PN is therefore forwarded within PTN 108 to CST Support 410.

2) CST Support 410 uses CST Prot 408 to request call completion information from CST Func 406 of WO Gateway 124.

3) CST Func 406 requests the called mobile's user profile from SCF 202 through SCF Enq 404 and SCF Enqb 412.

4) SCF 202 retrieves the user profile from a subscriber database supporting SCF 202.

5) If necessary, according to the user profile (e.g., the profile indicates that location based information is required for IN service), SCF 202 inquires HLR 206.

6) HLR 206 uses the normal routines of public cellular system 140 to retrieve the MT status from VLR 226 and the nodes handled by VLR 226. After processing of the various call completion conditions, MT status, location, time, etc., SCF 202 retrieves a call termination result. SCF 202 sends the result, typically a destination number, over SCF Enqc 412 and SCF Enqa 404 to CST Func 406 which forwards it to CST Support 410.

7) CST Support 410 transfers the task to PTN ctrl 108 for routing to the destination or destinations.

Figure 5A:
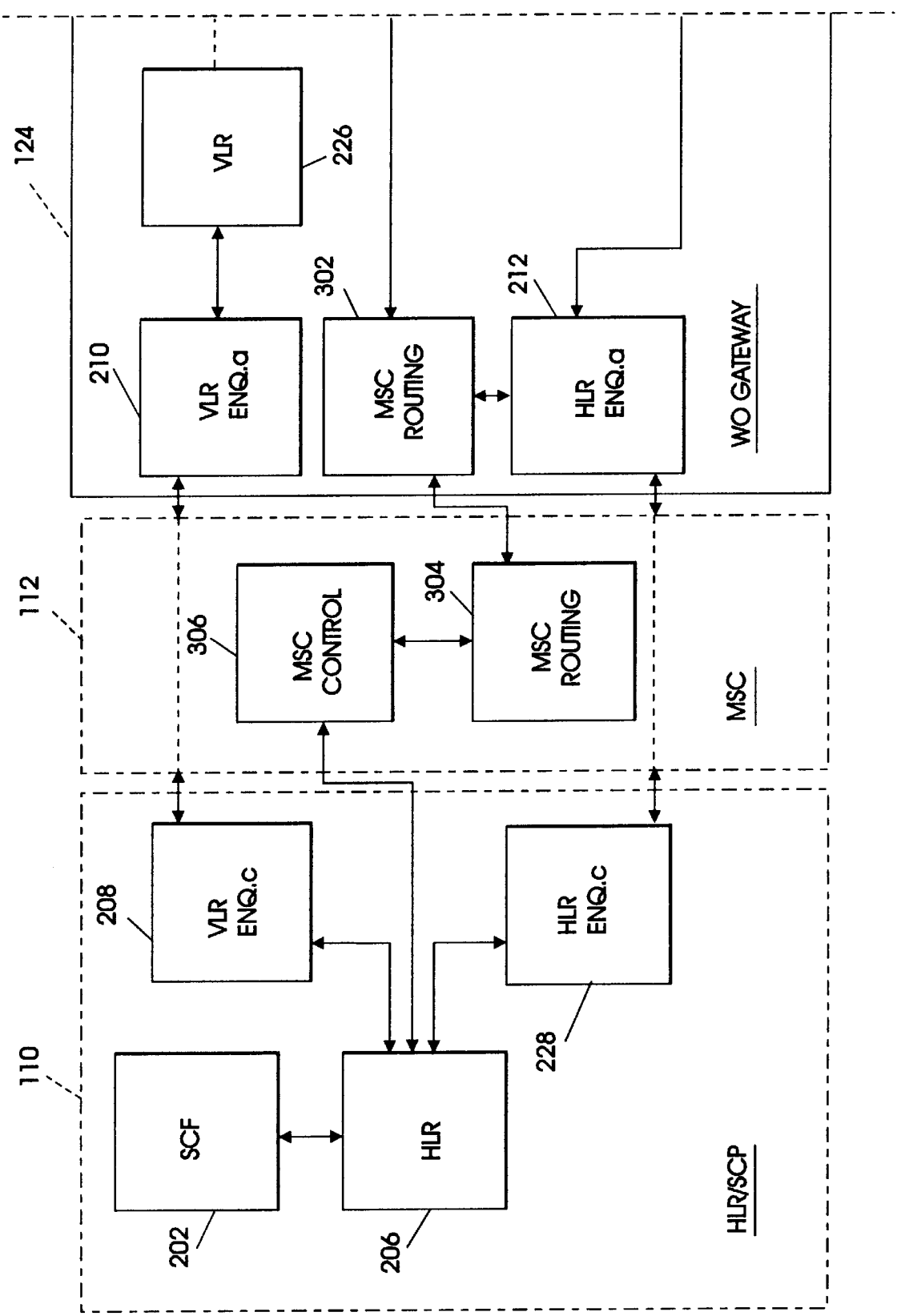
FIG. 5B is a functional block level diagram of an alternative embodiment of the invention shown in FIG. 3 that provides an enhanced call routing feature.

Referring now to FIG. 5, therein is shown another alternative configuration of the embodiment of the invention shown in FIG. 1. The alternative configuration shown in FIG. 5 provides an enhanced routing function. In this embodiment, PLMN 102 may provide both public and private service without the need to use PSTN 104. In this case, PTN 109 need not be connected to PSTN 104 when providing the functions provided by the basic routing function. In the configuration shown in FIG. 5, the functional blocks have been added to the configuration shown in FIG. 3. DSS1Puba 502 has been added to WO Gateway 124 and DSS1Pubb 504 has been added to PTN 108. DSS1Puba 502 and DSS1Pubb 504 allow WO Gateway 124 to connect calls from PMTs in wireless office system 142 to PTN 108, identically to calls made from PMTs in public cellular system 140. PTN 108 may then handle the calling PMTs as it handles any external user that calls through PSTN 104. DSS1Puba 502 and DSS1Pubb 504 emulate a public switch, i.e., a PSTN control office over interface B from the viewpoint of PTN 108. DSS1Puba 502 and DSS1Pubb 504 perform layer 3 ISDN PRI signaling. The enhanced routing function of FIG. 5 also requires that call control 220, MSC routing 304, VLR 214 and RAN link 216 be enhanced over the configuration of FIG. 3. Call control 220 is enhanced to handle routing via PTN 108.

The enhanced routing function provides the following:

1) PMTs operating in PLMN 102 may call directly into PTN 108 via an external line of PTN 108. The CMTs and FT receive a group number in the numbering plan of PLMN 102. When a number of the corporate group is called, the call is routed over interface B to PTN 108. This allows a PMT to call a corporate group number without dialing the area code of PSTN 104 since it is not necessary to route the call through GMSC 136 and PSTN 104.

2) CMTs may request an external line toward public cellular system 140 through PTN 108.

3) An intelligent routing function enables CMTs to use various IN functions provided by SCF 202 of HLR/SCP 110. As an alternative, these functions may also be provided by SCF 159 of IN 106 when originating a call. Preferred routing and selective call barring are examples of originating IN services. For example, the originating IN service may be used to select the shortest path when roaming away from the location of the home office to avoid tromboning via a remote PTN node. Examples of criteria for shortest path selection at a certain location includes calling certain B-numbers or dialing a prefix. The service may also be used for barring selected calls to PMTs. In this feature, the corporate group is defined as a closed user group with outside calls barred, i.e., corporate group members are not allowed to call members outside the group (this condition may be defined both in PLMN 102 and PTN 108). When the IN selected calls barred service is attached, a corporate group CMT or FT may call a PMT only under certain conditions. The conditions may be based on calling/called location, B-number, time, etc.

When a call is originated from a CMT subscribing to originating IN service and located within wireless office system 142, RAN link 216 retrieves the profile of the CMT from VLR 202. Because originating IN service is to be performed, RAN link 216 routes the call to call control 220 instead of PTN 108. Call control requests subscriber information from HLR 206 before call setup, and the IN function is executed by HLR/SCP 110.

It is believed that the operation and construction of the present invention will be apparent from the foregoing description and, while the invention shown has been characterized as particular embodiments, changes and modifications may be made therein without departing from the spirit and scope of the invention as defined in the following claims.

What is claimed is:

1. A method of call routing in a telecommunications system combination having a private telephony network, PTN, including a plurality of nodes, each of said nodes assigned at least one personal number, PN, and at least one subscriber number, wherein said PTN provides private telephony service at each of said nodes, said telecommunications system combination further having a mobile network including a wireless system coupled to a selected node of said PTN over a first interface, said wireless system having at least one mobile terminal associated with a selected at least one PN and a selected at least one subscriber number, both assigned to said selected node, said mobile network further including a cellular system coupled to said wireless system, said method comprising the steps of:

receiving a call in said PTN directed to the selected node;

routing said call over the first interface from said PTN to the wireless system;

determining, in the wireless system, whether said call was received over the first interface; and in response to an affirmative determination:

sending a request for a roaming number from the wireless system to the cellular system;

receiving said roaming number in the wireless system; and routing said call to a location within the mobile network indicated by said roaming number.

2. The method of claim 1, in which said step of receiving a call comprises the steps of:

receiving a call initiated within the wireless system, said call placed to the selected at least one PN;

routing said call from the wireless system to the PTN; and directing said call to the selected node.

3. The method of claim 1, in which said cellular system is coupled to the PTN by an external network, and in which said step of receiving a call comprises the steps of:

receiving a call initiated within the cellular system, said call placed to the selected at least one PN;

determining that the selected at least one PN is valid;

determining the at least one subscriber number from the selected at least one PN;

routing said call to the PTN over said external network; and directing said call to the selected node of said PTN.

4. The method of claim 1, in which said cellular system is coupled to the PTN through an external network, and in which the step of routing said call to a location within the mobile network comprises the steps of:

routing said call to the PTN for outgoing connection through the external network to the cellular system; and completing said call to the at least one mobile terminal within the cellular system.

5. The method of claim 1, in which said step of routing said call to a location within the mobile network comprises:

completing said call to the at least one mobile terminal within the wireless system.

6. The method of claim 1, in which the cellular system is coupled to the wireless system through a trunk line, said step of receiving a call comprises the steps of:

receiving a call initiated within the cellular system, said call placed to the selected at least one PN;

determining that the at least one PN is valid;

routing said call from the cellular system to the wireless system over the trunk line; and routing said call from the wireless system to the PTN.

7. The method of claim 1, in which the cellular system is coupled to the wireless system through a trunk line, and in which the step of routing comprises routing said call over the trunk line to a location in the cellular system.

8. The method of claim 1, in which the cellular system is coupled to the wireless system through a trunk line, and in which the step of receiving a call comprises:

receiving a call initiated within the cellular system, said call placed to the selected at least one subscriber number; and routing said call from the cellular system to the PTN through the external network;

and, further in which the step of routing comprises routing said call over the trunk line to a location in the cellular system.

9. A method of call routing in a telecommunications system combination having a private telephony network, PTN, including a plurality of nodes, each of said nodes assigned at least one personal number, PN, and at least one subscriber number, wherein said PTN provides private telephony service at each of said nodes, said telecommunications system combination further having a mobile network including a wireless system coupled to a selected node of said PTN over a first interface, said wireless system having a first at least one mobile terminal associated with a selected at least one PN and a selected at least one subscriber number, both assigned to said selected node, said mobile network further including a cellular system coupled to said wireless system over a trunk line, said cellular system having a second at least one mobile terminal, wherein said first and second mobile terminals may roam within said mobile network, said method comprising the steps of:

receiving a call in the cellular system, said call directed from the first at least one mobile terminal to the second at least one mobile terminal, when the first and second at least one mobile terminals are located within the cellular system;

routing said call to the wireless system over the trunk line;

routing said call from the wireless system to the PTN; and routing said call from the PTN to the cellular system through an external network.

10. A method of call routing in a telecommuniciations system combination having a private telephony network, PTN, including a plurality of nodes, each of said nodes assigned at least one personal number, PN, and at least one subscriber number, wherein said PTN provides private telephony service at each of said nodes, said telecommunications system combination further having a mobile network including a wireless system coupled to a selected node of said PTN over a first interface, said wireless system having at first at least one mobile terminal associated with a selected at least one PN and a selected at least one subscriber number, both assigned to said selected node, said mobile network further including a cellular system coupled to said wireless system over a trunk line, said cellular system having a second at least one mobile terminal, wherein said first and second mobile terminals may roam within said mobile network, said method comprising the steps of:

receiving a call within the wireless system;

determining whether said call was initiated from the first at least one mobile terminal or the second at least one mobile terminal;

routing, responsive to a determination in the step of determining that said call was initiated from the first at least one mobile terminal, said call from the wireless system to the PTN;

routing said call to the cellular system through the external network; and routing said call from the cellular system to the wireless system over the trunk line.

11. A telecommunications system combination comprising:

a private telephony network, PTN, having a plurality of nodes, each of said nodes assigned at least one personal number, PN, wherein said private telephony network provides private telephony service at each of said nodes; and a mobile network including:

a wireless system coupled to a selected node of said PTN, said wireless system having at least one mobile terminal associated with a first at least one PN assigned to said selected node, said wireless system comprising a gateway function for routing calls placed to and from said first at least one PN, initiated from within said wireless system, through said PTN when said at least one mobile terminal is located within the coverage area of said wireless system; and a cellular system coupled to said gateway function, said cellular system including a service controller for translating said first at least one PN into a selected at least one mobile identification number, MIN, said cellular system further comprising a home location register for storing a roaming number associated with said at least one MIN, said roaming number indicative of a location of said at least one mobile terminal within said mobile network, and calls received in said PTN for said first at least one PN are routed within said mobile network according to said roaming number.

12. The telecommunications system combination of claim 11, wherein said gateway function is coupled to said PTN over a first interface and said PTN further comprises a PTN controller for routing calls directed to said first at least one PN over said first interface to said gateway function.

13. The telecommunications system combination of claim 12, wherein said gateway function further comprises a call controller for receiving a call, directed to said first at least one PN over said first interface from said PTN, requesting location information on said first at least mobile terminal from said HLR, receiving said roaming number from said HLR, and, routing said call to said roaming number.

14. The telecommunications system combination of claim 13, wherein said gateway function further comprises a RAN linker coupled to said call controller and said first interface, said RAN linker for processing calls originating from said at least one mobile terminal in the coverage area of said wireless system and transferring the called number to said PTN over said first interface, and, said RAN linker, further for performing call setup to said at least one mobile terminal when said at least one mobile terminal is identified by a roaming number received from said HLR in said call controller when a call to said at least one mobile terminal is received in said wireless system.

15. The telecommunications system combination of claim 14, wherein said first interface further comprises a digital subscriber signaler for coupling said RAN link and said call controller to said PTN, and wherein said digital subscriber signaler emulates a PTN node.

16. The telecommunications system combination of claim 14, wherein said first interface further comprises a digital subscriber signaler for coupling said RAN link and said call controller to said PTN, and wherein said digital subscriber signaler emulates a ISDN primary rate interface.

17. The telecommunications system combination of claim 11, wherein said cellular system further comprises a mobile switching center, MSC, coupled to said service controller and said HLR, said MSC further coupled to said gateway function of said wireless system over a trunk line wherein said selected at least one mobile terminal is provided with said private telephony service while located in the coverage area of said cellular system.

18. The telecommunications system combination of claim 17, wherein said MSC further comprises a first router for routing calls initiated from said at least one mobile terminal for a second at least one PN of said PTN while said at least one mobile terminal is located within the coverage area of said cellular system, to said gateway function over said trunk line for termination in the PTN.

19. The telecommunications system combination of claim 17, wherein said gateway function further comprises a second router for routing calls originating in the PTN to said first at least one PN over said trunk line to said MSC, when said at least one mobile terminal is located in the coverage area of said cellular system.

20. The telecommunications system combination of claim 17, wherein said at least one mobile terminal comprises a first at least one terminal and, said cellular system has a second at least one terminal and said gateway function further comprises:
 a VLR for retrieving subscriber information from said HLR over said trunk line when said first at least one mobile terminal or said second at least one mobile terminal registers within said wireless system;
 a RAN linker coupled to said VLR, said RAN linker for performing calling number analysis and retrieving calling subscriber information indicative of whether said call is initiated from said first or second at least one mobile terminal when a call is initiated from said first or second at least one mobile terminals within the coverage area of said wireless system; and
 a call controller coupled to said RAN linker, said call controller for requesting a roaming number from said HLR if said call is initiated by said second at least one mobile terminal and routing said call to said roaming number, or, for routing said call to said PTN if said call is initiated by said first at least one mobile terminal.

21. The telecommunications system combination of claim 17, further comprising an intelligent network, IN, and wherein said gateway further comprises a computer supported telephony, CST, function for providing a CST interface between said PTN and said mobile network, and, further, wherein said at least one mobile terminal is provided CST services.

22. The telecommunications system combination of claim 21, wherein said PTN further comprises a CST supporter, coupled to said CST function, wherein all calls received in said PTN for said first at least one PN are routed to said CST supporter.

23. The telecommunications system combination of claim 17, wherein said at least one mobile terminal comprises a first at least one terminal and, said cellular system has second at least one terminal and, wherein said gateway is coupled to said PTN over a first and a second interface, and, further, said gateway function further comprises:
 a VLR for retrieving subscriber information from said HLR over said trunk line when said first at least one mobile terminal and said second at least one mobile terminal register within said wireless system;
 a RAN linker coupled to said VLR, said RAN linker for performing calling number analysis and retrieving calling subscriber information indicative of whether said call is initiated from said first or second at least one mobile terminal when a call is initiated from said first or second at least one mobile terminal from within the coverage area of said wireless system; and
 a call controller, coupled to said RAN linker, said call controller for routing a selected call initiated from said second at least one mobile terminal to said first at least one PN over said second interface to said PTN, and, wherein said PTN further comprises a PTN controller for routing said selected call over said first interface to said gateway function.

24. The telecommunications system combination of claim 23, said second interface comprises a digital system signaler, said digital system signaler for emulating an external switch, wherein said selected call from said second at least one mobile terminal to said first at least one PN appears as a call from an external switching network to said PTN.

25. A method of call routing in a telecommunications system combination having a private telephony network, PTN, including a plurality of nodes, each of said nodes assigned at least one personal number, PN, and at least one subscriber number, wherein said PTN provides private telephony service at each of said nodes, said telecommunications system combination further having a mobile network including a wireless system coupled to a selected node of said PTN over a first interface, said wireless system having at first at least one mobile terminal associated with a selected at least one PN and a selected at least one subscriber number, both assigned to said selected node, said mobile network further including a cellular system coupled to said wireless system over a trunk line, said cellular system having a second at least one mobile terminal, wherein said first and second mobile terminals may roam within said mobile network, said method comprising the steps of:
 receiving a call within the wireless office system;
 determining whether said call was initiated from the first at least one mobile terminal or the second at least one mobile terminal;
 routing, responsive to a determination in the step of determining that said call was initiated from the second at least one mobile terminal, said call from the wireless system to the cellular system through the external network; and
 routing said call from the cellular system to the PTN over the trunk line.

* * * * *

UNITED STATES PATENT AND TRADEMARK OFFICE
CERTIFICATE OF CORRECTION

PATENT NO. : 5,890,064
DATED : Mar. 30, 1999
INVENTOR(S) : Widergen et al.

It is certified that error appears in the above-identified patent and that said Letters Patent is hereby corrected as shown below:

| | |
|---|---|
| Column 9, line 23 | Replace "Bnumber" With --B-number-- |
| Column 11, line 38 | Replace "as" With --PNP-- |
| Column 11, line 50 | Replace "Bnumber" With --B-number-- |
| Column 11, line 53 | Replace "Bnumber" With --B-number-- |
| Column 13, line 26 | Replace "Bnumber" With --B-number-- |
| Column 14, line 36 | Replace "Bnumber" With --B-number-- |
| Column 19, line 44 | Replace "telecommunciations" With --telecommunications-- |

Signed and Sealed this

Twentieth Day of July, 1999

Attest:

Q. TODD DICKINSON

*Attesting Officer*   *Acting Commissioner of Patents and Trademarks*